US011538048B1

(12) United States Patent
Nahta et al.

(10) Patent No.: US 11,538,048 B1
(45) Date of Patent: Dec. 27, 2022

(54) PREDICTIVELY IDENTIFYING ACTIVITY SUBSCRIBERS

(71) Applicant: Pinterest, Inc., San Francisco, CA (US)

(72) Inventors: Mohak Nahta, San Francisco, CA (US); Henry Lien, Belmont, CA (US)

(73) Assignee: Pinterest, Inc., San Francisco, CA (US)

( * ) Notice: Subject to any disclaimer, the term of this patent is extended or adjusted under 35 U.S.C. 154(b) by 644 days.

(21) Appl. No.: 16/231,441

(22) Filed: Dec. 22, 2018

(51) Int. Cl.
*G06Q 30/02* (2012.01)
*G06N 20/00* (2019.01)

(52) U.S. Cl.
CPC ......... *G06Q 30/0202* (2013.01); *G06N 20/00* (2019.01)

(58) Field of Classification Search
None
See application file for complete search history.

(56) References Cited

U.S. PATENT DOCUMENTS

| 10,607,242 | B1 * | 3/2020 | Wood | G06Q 30/0201 |
| 2012/0303558 | A1 * | 11/2012 | Jaiswal | G06N 20/00 706/12 |
| 2017/0142035 | A1 * | 5/2017 | Bradley | H04L 67/10 |
| 2018/0114232 | A1 * | 4/2018 | Dalal | G06Q 50/01 |

FOREIGN PATENT DOCUMENTS

| CA | 2922032 A1 * | 8/2016 | ........... G06F 16/337 |
| WO | WO-03052663 A1 * | 6/2003 | ............. G06Q 30/02 |

OTHER PUBLICATIONS

Gal Oestreicher-Singer and Lior Zalmanson, Content or Community? A Digital Business Strategy for Content Providers in the Social Age, Jun. 2013, MIS Quarterly, vol. 37 No. 2, p. 591-616 (Year: 2013).*

* cited by examiner

*Primary Examiner* — Amanda Gurski
(74) *Attorney, Agent, or Firm* — Athorus, PLLC (57) ABSTRACT

Systems and methods for predictively identifying content sources as likely activity subscribers to an online service is presented. In view of a corpus of activity data describing activity of users of an online service, an analysis of this corpus of activity data is carried out to identify one or more content sources that are not activity subscribers but whose content is posted on the online service. A machine learning model is employed to predictively identify at least some content sources that are not activity subscribers of the online service that could likely become activity subscribers. A first content source of the one or more content sources is identified as a likely potential activity subscriber according to the trained machine learning model and the first content source is notified with information for becoming an activity subscriber.

20 Claims, 9 Drawing Sheets

PREDICTIVELY IDENTIFYING ACTIVITY SUBSCRIBERS

BACKGROUND

There are many online services where an entity (e.g., a computer user, and organization, a company, etc.) is able to post information to a network store, referred to as the cloud. The motivations for posting may be varied: a desire to maintain a personal collection for personal viewing, to share content with others and/or eliciting comments by others visiting the online service. In many instances, these online services are massive: they support millions of users many of which interact one or more times daily with content on the online service.

Of these persons and/or entities, there is a subset that is interested in knowing how items of content that they have posted on the online service is "doing." In other words, these entities wish to know information about what other persons and/or entities are doing based on their own activities. By way of illustration, User A may wish to know how many other people/entities have viewed or interacted with an item of content that User A posted to an online service. Indeed, if User A's activities are commercial in nature, it would be of great benefit to understand how others have interacted with User A's content. Of course, not all persons or entities that wish to understand how others have interacted with their content are commercial entities. Indeed, there are a variety of motivations for understanding how one's own activities are perceived and used by others, and with many online services, activity statistics of others with regard to one's own content can be generated.

Often, there are persons and entities that would greatly benefit from understanding how their content is viewed and otherwise interacted with yet, for some reason, do not subscribe to options that provide such information. For a self-published artist, understanding what content has attracted interest, and how much interest, can be very important. Similarly, for a commercial entity, understanding how its content is viewed, by whom and when could lead to significant financial benefits. However, as indicated above, some entities may not subscribe to such options, or understand that they can obtain activity statistics. Some entities may not even be online service subscribers and not realize the potential of understanding statistics with regard to the usage of their content.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

According to aspects of the disclosed subject matter, systems and methods for predictively identifying entities (persons and/or organizations) that would benefit from access to information regarding how the entity's content is viewed and/or otherwise interacted with by others is shown. In various embodiments, based on user interaction information with regard to content of an entity that is not a subscribing entity, an analysis of a large corpus of user interaction data is conducted, analyzing the data to predictively identify one or more entities that will likely become a subscribing entity or would likely benefit from information describing how others view and/or interact with their content. Usage information regarding the content of the one or more entities can be aggregated and provided to the one or more entities by way of illustration and invitation.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of further definition, an "activity subscriber" corresponds to a user or entity that has indicated a desire to receive activity statistics regarding items of content corresponding to them. This indication typically includes subscribing with the online service to receive the activity statistics. Often, but not exclusively, the subscription to the activity services is secured as a paid subscription.

In order to describe the process of predictively identifying entities that would benefit from access to information regarding how others view and interact with their content, reference is made to the process in which the content is captured. To begin, reference is made to FIG. 1.

Figure 1:
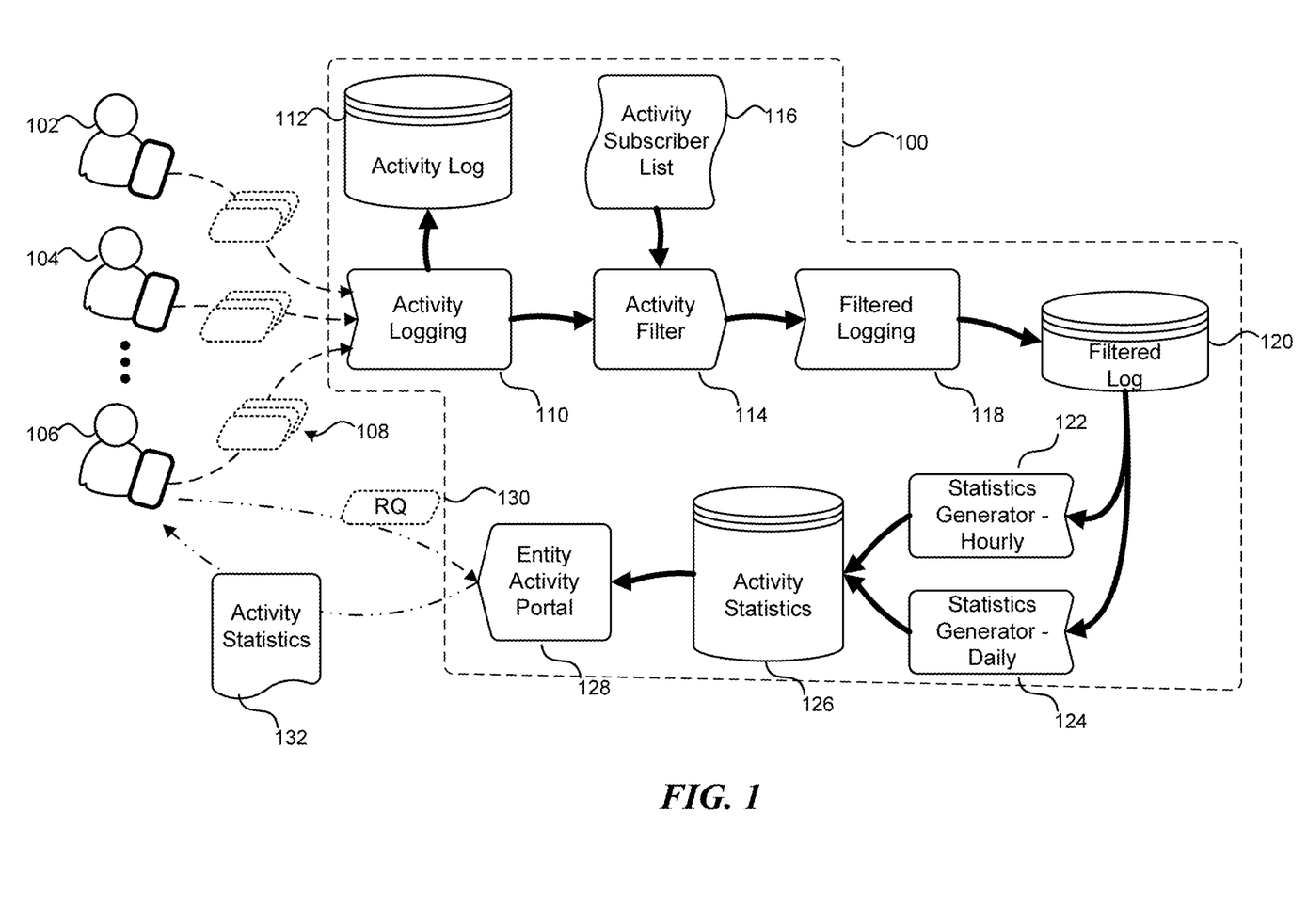
FIG. 1 is a block diagram illustrating an exemplary processing of user activity by an online service in generating activity statistics of an item of content based on captured activity data in accordance with aspects of the disclosed subject matter.

FIG. 1 is a block diagram illustrating an exemplary processing of users' activities by an online service 100 in generating activity statistics of an item of content from aggregated activity data, in accordance with aspects of the disclosed subject matter. As part of this process, numerous users/subscribers (including users 102-106) may view and/or otherwise interact with content posted to the online service 100, as well as submit one or more items of content to the online service, such as user 106 submitting content items 108 to the online service. By way of example and illustration, the one or more items of content 108 may include images, including images generated, or corresponding in some manner to other parties. For example, a user may submit an image of a favorite jacket advertised by a local retail shop. In this example, while the image is posted to the online service by the user, the local retail shop may have an interest in how the particular image performs (is viewed and/or interacted with) by other users/subscribers of the online service.

In one embodiment of the disclosed subject matter, as users submit content to the online service and/or interact with content stored by the online service, these user actions are captured by an activity logging feature 110 of the online service 100. In one embodiment, the activity logging feature 110 carries out the task of recording all activity of users with regard to the online service 100. These activities may include, by way of illustration and not limitation, viewing, selecting, editing, posting, reposting, organizing collections, annotating items and collections, and the like. These activities are recorded in an activity log 112 by the activity logging feature 110, where they can be accessed for review and analysis as needed.

Regarding the activity logging feature 110, in many instances the amount of user/subscriber activity with the online service is substantial. By way of illustration, there are several popular online services that have hundreds of millions of users/subscribers. Of course, while not all users interact with any given online service at the same time, these users/subscribers can collectively generate hundreds of millions of user interactions with the online service in any given day. Clearly, the task of logging the activities of these users is, of itself, a significant task. Accordingly, the activity logging feature 110 is nearly completely focused on logging/aggregating the user activities. However, in accordance with aspects of the disclosed subject matter, the activity logging feature 110 also passes some or all of the aggregated activity to an activity filter feature 114. In various embodiments, the activity logging feature 110 is configured to periodically forward the aggregated activity of the completed period to the activity filter feature 114, such that the corpus of activity data (as stored in the activity log 112) can be incrementally processed.

For its part, upon receiving the various user activities, whether it is the entire corpus of activity data or activity data of a recently completed logging period, and in view of an activity subscriber list 116, the activity filter feature 114 filters out all user activities that do not correspond to a user/subscriber on the activity subscriber list. In this regard, the activity subscriber list 116 identifies those users for which the online service monitors content corresponding to the activity subscribers and user activity with that content for the purpose of providing on-demand activity statistics. The results of the activity filter service 114 is a set of filtered user activities with regard to content items corresponding or belonging to activity subscribers. The filtered user activities are then passed by the activity filter feature 114 to a filter logging feature 118.

The filter logging feature 118 takes the filtered events from the activity filter 114, typically as an incremental set of filtered events, and stores these events in a filter log 120 in a manner and organization that can be easily accessed to determine statistics regarding the activity of users with regard to particular items of content. Typically, but not exclusively, this filter log 120 is an indexed file and/or a reserve indexed file in which user activities with individual items of content can be easily identified and accessed.

With the filtered log 120 generated, and periodically updated as new user activity is recorded, statistical information regarding the various items of content can be generated. According to aspects of the disclosed subject matter and as shown in FIG. 1, the online service 100 includes both an hourly statistics generator 122 and a daily statistics generator 124. The purpose for having both statistics generators 122 and 124 is that in generating hourly statistics there will be times that false readings are incorporated into the statistics. More particularly, without the ability to view user activity over time, interactions that may be spoofed, or the result of hyper-activity might not be detected. Spoofing refers to one or more parties causing user activity to be recorded where none actually occurred. Hyper-activity refers to repeated activity to simulate a significant amount of user activity. In both instances, the intent is frequently to artificially inflate the apparent number of user interactions with one or more content items.

While an hourly statistics generator 122 and daily statistics generator 124 are described herein, this is illustrative and not limiting. In various embodiments, an online service 100 may have only a single statistics generator, or multiple statistics generators corresponding to any desired period of time.

The statistics generators collectively generate statistical information for hourly and daily user activity with regard to content items corresponding to activity subscribers. This information is stored in an activity statistics store 126.

With user activity statistics generated, where the user activity statistics reflect user activity with regard to content items belonging to or originating from an activity subscriber, the online service 100 also offers an event activity portal 128. The event activity portal 128 is configured to receive a request regarding user activity with one or more particular items of content, or items of content corresponding to an activity subscriber. By way of illustration, FIG. 1 illustrates user 106 submitting an activity request 130 to the event activity portal 128 to obtain activity statistics 132 with regard to user activity in relation to one or more items of content corresponding to the user.

This processing of information enables those activity subscribers to identify user activity on the online service 100 in relation to one or more items of content corresponding to the activity subscriber. However, according to aspects of the disclosed subject matter, there may be many entities that would be benefitted by having activity statistics available to them, including vendors. Unfortunately, not all entities that might be advantaged by such information are activity subscribers. In this case, it would be beneficial and advantageous to predictively identify entities that would benefit from becoming activity subscribers.

Figure 2:
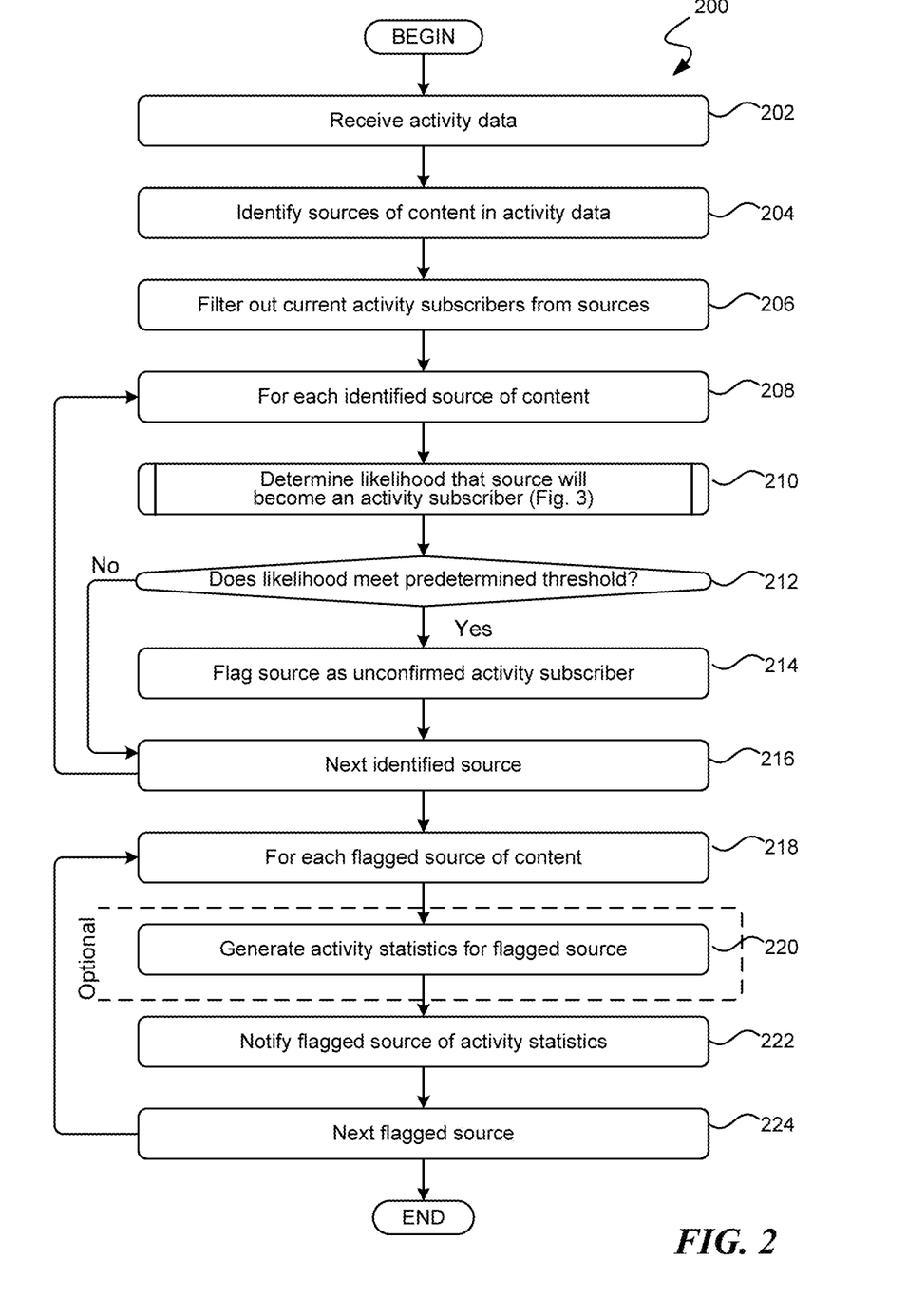
FIG. 2 is a flow diagram illustrating an exemplary routine suitable for predictively identifying likely activity subscribers in accordance with aspects of the disclosed subject matter.

FIG. 2 is a flow diagram illustrating an exemplary routine 200 suitable for predictively identifying likely activity subscribers in accordance with aspects of the disclosed subject matter. Beginning at block 202, the activity data is accessed or received. In accordance with aspects of the disclosed subject matter, the activity data comprises a plurality of activity records indicating a user's or subscriber's interaction with an item of content.

At block 204, the sources of the items of content in the activity data are identified. This identification may be conducted through an analysis of the corpus of user data. As those skilled in the art will appreciate, this may be carried out through an iteration of the activity records, identifying the sources of content for each record, and aggregating the results. Identifying a source of a content item may include determining the source location of the item of content (i.e., its source uniform resource locator or URL), tags associated with the item of the content that indicate the source, content matching that matches content items to those of known sources based on visual and/or textual similarities, and the like. Content sources may be identified in this analysis according to those that have one or more content items posted on the online service, content items belonging to a content source that have been posted by other users, the number of content items on the online service corresponding to the content source, and the like.

At block 206, after having identified the sources of content items in the activity data, those sources that are activity subscribers, as determined by the activity subscriber list 116, are filtered out of the list (since they are already activity subscribers.) At block 208, an iteration loop is begun to iterate through each of the remaining sources of content to predictively determine if they are likely activity subscriber candidates. This determination is made through the processing of steps 210 through 214.

At block 210 and in processing a current content source, a likelihood that the currently iterated content source would benefit from becoming an activity subscriber is generated. Generating this likelihood is described in more detail with regard to routine 300 of FIG. 3.

Figure 3:
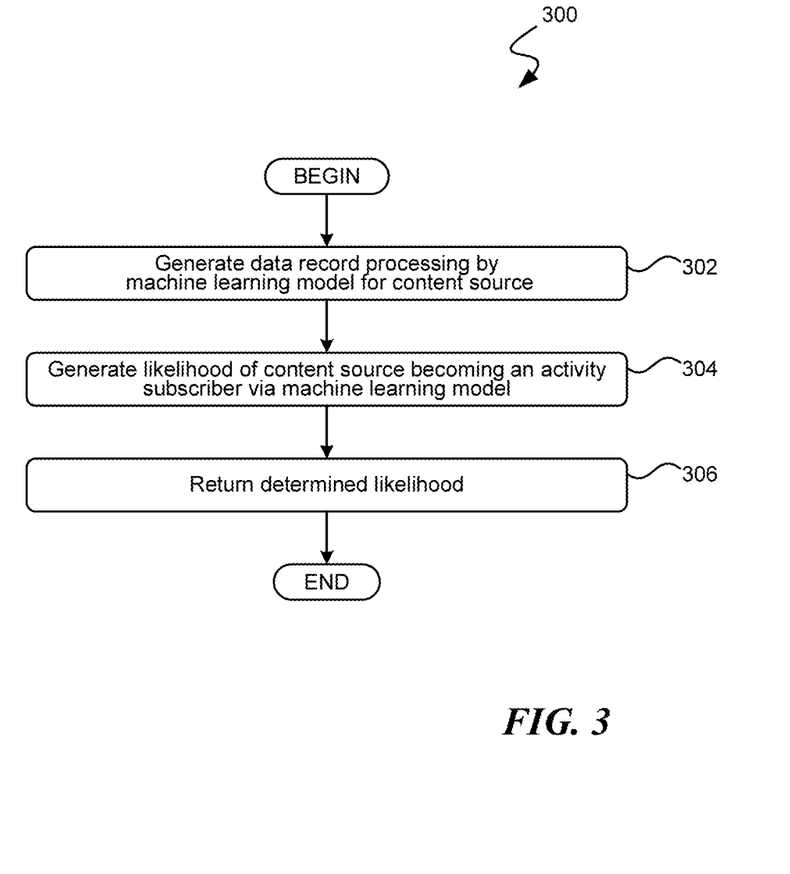
FIG. 3 is a flow diagram illustrating an exemplary routine for determining a likelihood of an entity becoming an activity subscriber in accordance with aspects of the disclosed subject matter.

Turning to FIG. 3, this figure is a flow diagram illustrating an exemplary routine 300 for determining a likelihood of an entity/content source becoming an activity subscriber in accordance with aspects of the disclosed subject matter. Beginning at block 302, a data record, suitable for processing by a trained machine learning model is generated for the entity/content source. At block 304, a likelihood of the entity/content source becoming an activity subscriber is generated using the trained machine learning model. The machine learning model, as will be discussed in greater detail below, is trained to determine a likelihood that a given entity/content source would benefit from becoming an activity subscriber. After generating the likelihood for the entity/content source, the routine 300 returns that likelihood.

Returning again to routine 200 of FIG. 2, after determining the likelihood that the currently iterated entity/content source would be advantaged by or benefit from becoming an activity subscriber, the routine 200 proceeds to decision block 212. At decision block 212, a determination is made as to whether the determined likelihood of the currently iterated content source becoming an activity subscriber meets a predetermined threshold. If the threshold is not met or exceeded, the routine 200 proceeds to block 216 where the iteration loop either returns to block 208 to process another content source, or if all content sources have been processed, proceeds to block 218. In the alternative, if the likelihood meets or exceeds the predetermined threshold, the routine 200 proceeds to block 214.

At block 214, the currently iterated content source is flagged as an unconfirmed activity subscriber. Thereafter, at block 216 the iteration loop either returns to block 208 to process another content source, or if all content sources have been processed, proceeds to block 218.

At block 218, another iteration loop is begun, in this case to iterate through each of the flagged content sources. At block 220, an optional step is performed to generate activity statistics for the currently iterated flagged content source. These activity statistics are generated as a way of illustrating to the flagged content source the value of statistics and the advantages of becoming an activity subscriber.

At block 222, the flagged content source is notified with a suggestion that it might benefit from becoming an activity subscriber. The activity statistics that were generated in block 220 may be included in the notification.

At block 224, if there are additional flagged content sources to process in the iteration loop, the routine 200 returns to block 218 to process the next flagged content course. If, at block 224, there are no more flagged content sources to process, the routine 200 terminates.

As mentioned above and according to various aspects of the disclosed subject matter, the likelihood of a content source being benefitted from and enticed to become an activity subscriber can be determined by a trained machine learning model. Additionally, while not specifically shown as part of routine 200 and for the unconfirmed activity subscribers, information regarding whether or not an unconfirmed activity subscriber takes positive action to become an activity subscriber can be tracked, and this "conversion" information can then be utilized to further train the machine learning model discussed above in regard to routine 300 in improving accuracy of identifying potential activity subscribers.

Figure 4:
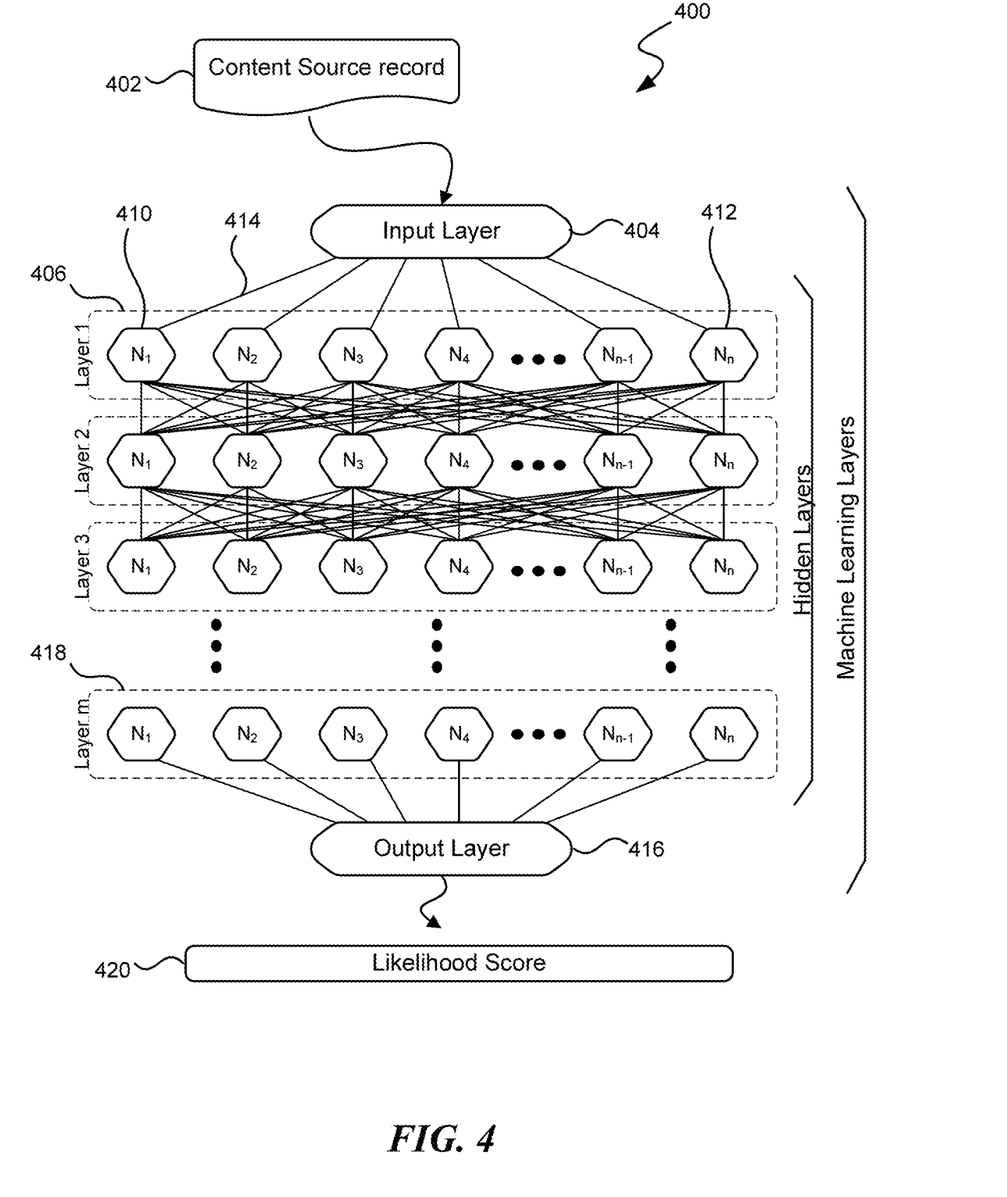
FIG. 4 is a block diagram illustrating elements of a deep learning/machine learning model suitable for generating a likelihood score of an entity becoming an activity subscriber in accordance with aspects of the disclosed subject matter.

As those skilled in the art will appreciate, machine learning models, which include deep neural networks, utilize one or more input items and generate output information (in this instance a likelihood or prediction) from a convolution process. FIG. 4 is a pictorial diagram illustrating elements of a deep neural network/machine learning model suitable for generating a likelihood score of an entity becoming an activity subscriber in accordance with aspects of the disclosed subject matter.

As those skilled in the art will appreciate, the deep neural network 400 comprises multiple executable layers, including an input layer 404, and output layer 416, and one or more hidden layers. By way of illustration, executable model 400 includes m hidden layers, including hidden layers 406 and 418. As suggested above, the input layer 404 accepts the input data, e.g., content source record 402 and one or more items of metadata regarding the content source, for which the model 400 will generate a corresponding result: a likelihood score that the content source will benefit from and/or become an activity subscriber, (e.g., likelihood score 420).

The input layer 404 accepts the input data, in this case content source record 402 which was generated in block 302 of routine 300, and any metadata that may be associated with the content source and, according to one or more predetermined algorithms and/or heuristics, generates a plurality of intermediate values for one or more aspects, features and/or facets from the input data. These values (not illustrated but implied by the various edges, such as edge 414, extending from the input layer 404 to the various processing nodes of the first hidden layer 406) are output of the first layer and distributed as input data to processing nodes, such as processing nodes 410 and 412, in the first of the hidden layers of the executable model 400.

Typically, though not exclusively, a value/facet of the input data passed from the input layer 404 to a first processing node in the first hidden layer, such as node 410 of hidden layer 406, is different than a value/facet passed to a second processing node of that same hidden layer, such as to node 412 of hidden layer 406. Moreover, while model 400 suggests that there is 1:1 relationship between output values of the input layer and input nodes of the first hidden layer, this should be understood to be illustrative and not limiting upon the disclosed subject matter. Indeed, in various embodiments, all output values of a first given layer are provided as input values to each processing node in the next layer.

Each hidden layer comprises a plurality of processing nodes. By way of illustration and not limitation, hidden layer 406 includes n processing nodes $N_1$-$N_n$. While the processing nodes of the first hidden layer 406 typically, though not exclusively, have a single input from the input layer, processing nodes of subsequent hidden layers typically have input values from one or more processing nodes of the previous input layer. As illustrated in executable model 400, each hidden layer (except for the first hidden layer 406) accepts input data/signals from each of the processing nodes of the prior hidden layer, as indicated by the edges proceeding from a processing node of an "upper" hidden layer (e.g., layer 406) to a "lower" hidden layer.

Each processing node implements one or more "convolutions" or "computations" on the input data it receives (whether the processing node receives a single item of input data, or plural items of input data) to produce a single output. These convolutions/computations may include any number of functions to generate the output data, such as (by way of illustration and not limitation) aggregations, clusterings, transformations, combinations, selections and/or filters, mathematical manipulations, linear and multivariate regressions, statistical determinations and predictions, and the like. Moreover, individual items of input data may be weighted such that a given item of input data plays a greater or lesser role in the overall computation of any processing node. Items of input data may be weighted in such a manner as to be ignored in convolution. Hyperparameters (data/values that are input from sources external to processing nodes of a prior input level) may also be utilized by all or some of the processing nodes of a hidden layer.

As will be appreciated by those skilled in the art, one of the interesting aspects of machine learning is that the various levels of the machine learning model are self-learning, meaning that when provided feedback regarding output accuracy, modifications are made to the weights, parameters, and processing of nodes in the various layers in order to achieve better results. Thus, except for initially established computations of the various processing nodes in a training phase of the machine learning process, a person is unlikely to have specific insight or knowledge as to the exact computations that any particular processing node of a hidden layer may utilize. Instead, during the training process of a machine learning process, the machine learning process makes its own determinations as to how to modify each computation to produce better/superior results for the input values it receives.

At the final hidden input layer, e.g., layer 418, the processing nodes provide their output data to the output layer 416. The output layer 416 performs whatever aggregations, calculations, normalizations and/or interpretations of the various items of input data to produce an output value of the model. In the illustrated example, the output layer 416 produces a likelihood score 420 indicating the likelihood of a content source benefitting from and/or subscribing as an activity subscriber. According to one embodiment of the disclosed subject matter, to produce the likelihood score, the output layer 416 aggregates and/or convolves together each item of output data from the final hidden layer 418.

Figure 5:
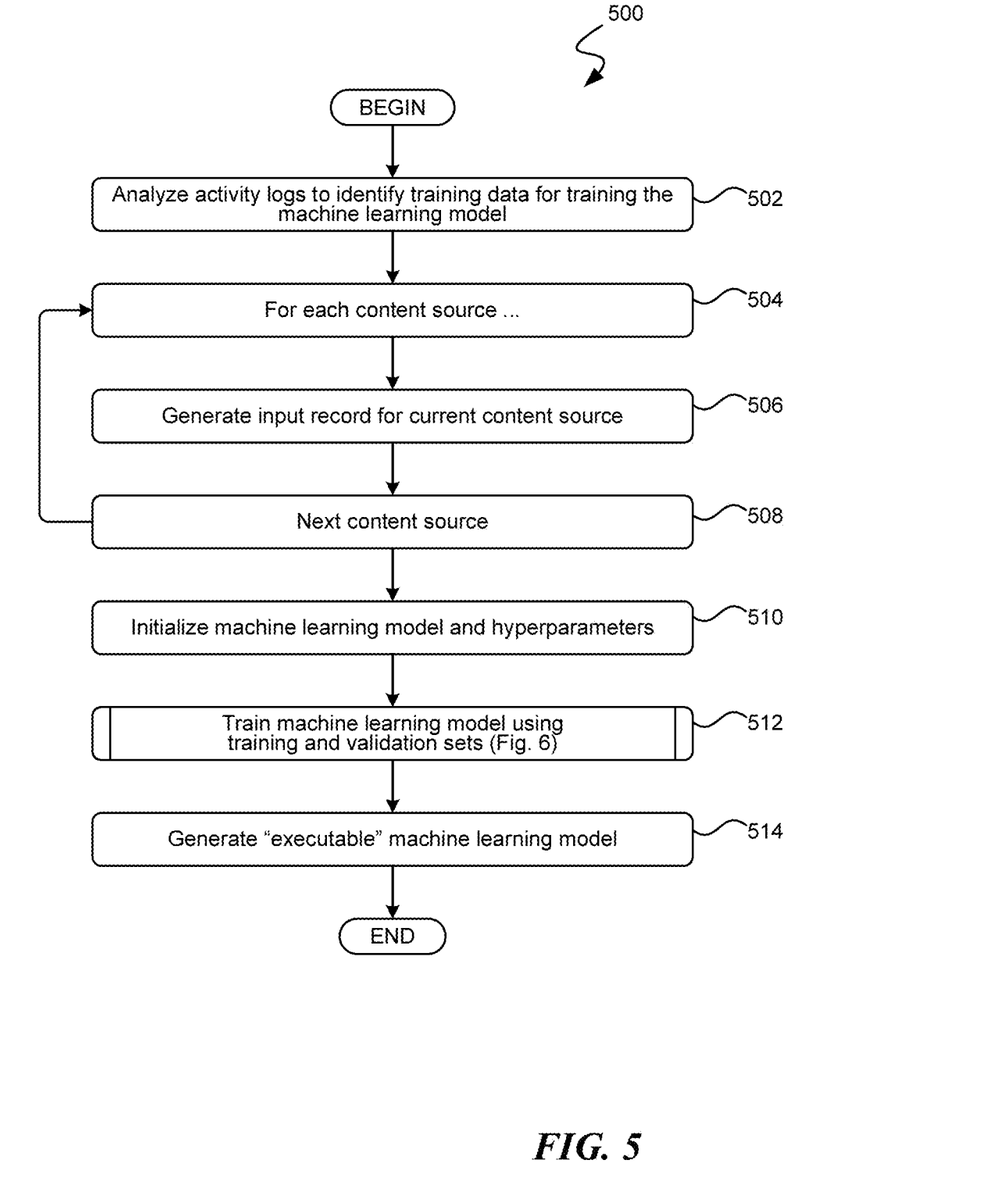
FIG. 5 is flow diagram illustrating an exemplary routine suitable for use for training a machine learning model in determining a likelihood score of a content source becoming and/or benefitting from an activity subscriber in accordance with aspects of the disclosed subject matter.

With regard to training a machine learning model to predict the likelihood of a content source being benefitted from and/or subscribing as an activity subscriber, reference is now made to FIG. 5. FIG. 5 is a flow diagram illustrating an exemplary routine 500 suitable for use for training a machine learning model in determining a likelihood score of a content source becoming and/or benefitting from an activity subscriber in accordance with aspects of the disclosed subject matter. Indeed, using the activity data of the activity log 110 and the activity subscriber list 116, the machine learning model can be trained. Indeed, the activity data in the activity log 112 (or multiple activity logs), in view of the activity subscriber list 116, a set of training data can be generated. In one embodiment, at block 502, an analysis of the activity data in the information log is made to identify information regarding content sources that are not on the activity subscriber list that may be added as negative examples in a set of training data while information regarding content sources that are activity subscribers are included as positive examples in the set of training data. Each of these "examples" corresponds to a content source. At least some of these examples, both positive and negative examples, are determined through the analysis as having similarities between the content source of the examples and the exemplary content source, including number of content items relating to a content source, type of entity/content source, and the like.

At block 504, an iteration loop is begun to iterate through each of the examples to place it in a form for training a machine learning model, such as machine learning model 400. Thus, at block 506, an input record is generated for the currently iterated content source. At block 508, if there are additional data sets to process, the routine 500 returns to block 504 and processes a next set of data. Alternatively, if there are no other content sources to process, the routine 500 proceeds to block 510.

At block 510, the various levels and processing nodes of the machine learning model to be trained are initialized for process, including establishing any hyperparameters that may be needed or desired to assist in processing the various input records. At block 512, the input records are passed to the machine learning model for training. Training the machine learning model is generally described in regard to FIG. 6.

Figure 6:
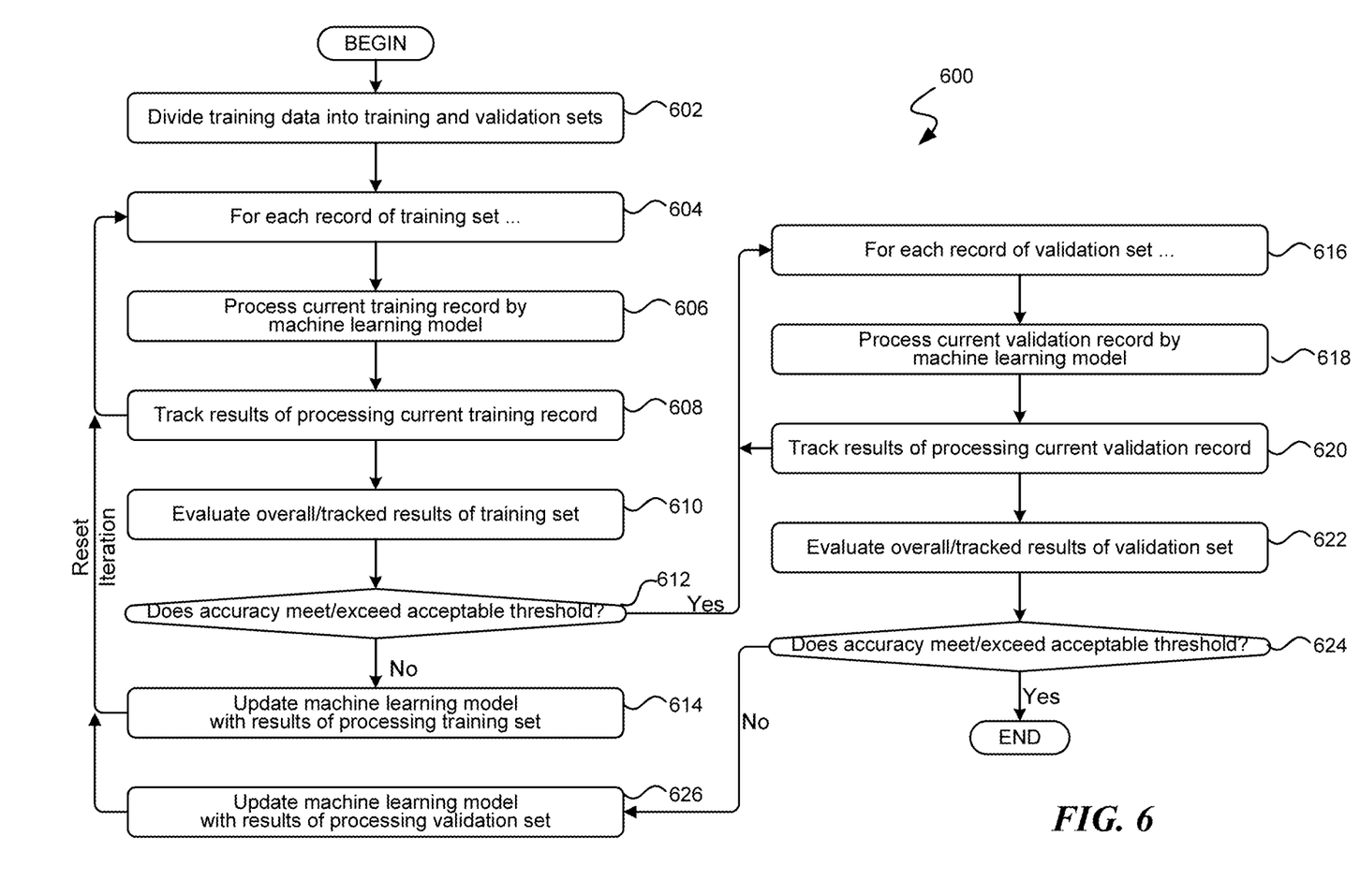
FIG. 6 is an exemplary routine suitable for use by a machine learning model for training the model in determining a likelihood score of an entity becoming an activity subscriber in accordance with aspects of the disclosed subject matter.

Turning to FIG. 6, this figure shows an exemplary routine 600 suitable for use by a machine learning model for training the model in determining a likelihood score of an entity/content source in becoming an activity subscriber in accordance with aspects of the disclosed subject matter.

At block 602, the training data that will be used to train the machine learning model is divided into two partitions: a training set and a validation set. The training records of each set are randomly selected from the body training data. As will be seen in this discussion, the training set is used in the majority of the training of the machine learning model, while the validation set is used to validate or verify whether the machine learning model is accurately trained by the training data, and not just conditioned to the training records of the training set. Accordingly, it is not necessary that the training set and validation set be equal in size. Indeed, the validation set need only be so large as to be able to provide an accurate determination of whether the machine learning model predicts the correct outcome to at least a threshold level of accuracy. Further still, the training set and the validation set each comprise training records and for each training record there is a corresponding known, correct answer that is used in training the machine learning model.

At block 604, an iteration loop is begun to iterate through the training set of the training data. At block 606, the machine learning model processes the currently iterated training record. As those skilled in the art will appreciate, processing the training record comprises providing the information to the machine learning training model where it is processed as generally described above in regard to FIG. 4.

In regard to processing the training record, the machine learning model, through its various layers, identifies elements of the currently iterated training record (corresponding to either a positive or negative example of an exemplary content source) to use as an item of criteria in determining (as a product of the output layer) a likelihood score as to whether the content source of the currently iterated training record will become an activity subscriber.

At block 608, the results of processing the currently iterated training record are tracked, including recording the predicted result (the likelihood score generated by the output layer of the machine learning model) in view of the items in the training record versus the actual results. This tracking, when aggregated, can be used to validate the results of the training of machine learning model and/or provide update information for the training of the machine learning mode through a feedback process that causes processing nodes in the various layers of the machine learning model to update and/or causes hyperparameters associated with the various layers and processing nodes to be modified.

Additionally, at block 608, if there are additional training records to process as part of the training set, the routine 600 returns to block 604 for processing the next training record. Alternatively, if all of the training records have been processed, the routine 600 proceeds to block 610.

At block 610, the results of the machine learning model (which reflect the current state of training of the model) are now evaluated in view of the actual results that should be determined if the machine learning model were trained perfectly (i.e., part of the results of tracking the various predictions by the machine learning model with regard to the training set.) This evaluation/determination results in an accuracy score indicating the overall accuracy of the machine learning model (as currently trained). With this accuracy score, at decision block 612, a determination is made whether a sufficient level of accuracy (i.e., does the accuracy score meet or exceed an acceptable threshold level) has been achieved by the machine learning model.

If the current accuracy of the machine learning model does not meet the acceptable threshold, the routine 600 proceeds to block 614. At block 614, the tracked results (in view of the actual results) are used to update aspects of, or train, the machine learning model. These updates may include modifications to the various processing layers and/or to the various hyperparameters used at the various layers. After updating the machine learning model in view of the tracked results, the routine 600 then proceeds back to block 604 where the iteration of the training set is reset/reinitialized such that the training records are again processed by the machine learning model.

With reference to decision block 612, if the determination is made that the results have met the acceptable threshold level, the routine 600 proceeds to block 616. At block 616, an iteration loop is begun to iterate through the validation records in the validation set. This iteration of validation records is to now validate that the machine learning model hasn't simply learned the pattern among the training records of the training set, but has actually achieved a satisfactory/acceptable level of accuracy. As those skilled in the art will appreciate, it is not uncommon for the machine learning model, in the course of being trained, to generate acceptable results (threshold level of accuracy) on a training set only to fail to achieve that acceptable level with a validation set.

At block 618, the currently iterated validation record of the validation set is processed by the machine learning model to generate a prediction with regard to the currently iterated validation training record, in similar manner as suggested above in regard to block 606. At block 620, the result of the processing is tracked and, if there are additional validation records to process, the routine 600 returns to block 616. Alternatively, if there are no additional validation records to process, the routine proceeds to block 622.

At block 622, the results (i.e., the predictive accuracy) of processing the validation set by the machine learning model, which reflect the current state of training of the model, are evaluated in view of the actual, previously known results that should be determined if the machine learning model were trained perfectly. This evaluation/determination results in a validation accuracy score indicating the overall accuracy of the machine learning model (as currently trained). With this validation accuracy score, at decision block 624, a determination is made whether a sufficient level of accuracy (i.e., does the validation accuracy score meet or exceed an acceptable threshold level) has been achieved by the machine learning model.

If, at decision block 624, the accuracy threshold is not met, the routine 600 proceeds to block 626. At block 626, the tracked results in processing the validation records (in view of the actual results) are used to update aspects of, or train, the machine learning model. As mentioned above, these updates may include convolution and aggregation modifications to the various processing layers, processing nodes, and/or to the various hyperparameters used in the various processing layers and processing nodes. After updating the machine learning model in view of the tracked results of the validation set, the routine 600 then proceeds back to block 604 to begin the entire process, starting with again processing the training set. Additionally, while not shown in FIG. 6, as an alternative to repeating the training process from block 604, the process could return to block 602 and randomly choose among the training data to establish a new training set and validation set.

With reference again to decision block 624, if the results (i.e., the validation accuracy score) of the validation set are determined to meet or exceed an acceptable tolerance, the routine 600 terminates, having sufficiently trained the machine learning model to the predetermined acceptable levels of accuracy. Of course, while not shown here, machine learning models can be subsequently trained to improve accuracy of a trained model. As suggested above, information regarding whether or not an unconfirmed activity subscriber becomes an activity subscriber can be utilized to retrain a machine learning model to improve its predictive accuracy.

With reference again to routine 500 of FIG. 5, after having trained the machine learning model on the training data, at block 514 an "executable" version of the machine learning model is generated. This executable version does not suggest that the machine learning model that was trained is not executable, but rather that at least some, and often much, of the framework that is used in training the model, including functionality to update the model, modify parameters, nodes and processing layers, as well as tracking functionality, can be removed, leaving an executable model that is both trained and that can operate more efficiently in generating its predictive results.

After generating the "executable" machine learning model, the routine 500 terminates.

Regarding routines 200, 300, 500 and 600 described above, as well as other routines and/or processes described or suggested herein including the process described in regard to FIG. 1, while these routines and/or processes are expressed in regard to discrete, descriptive steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any particular development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 8 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single- or narrowly-purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
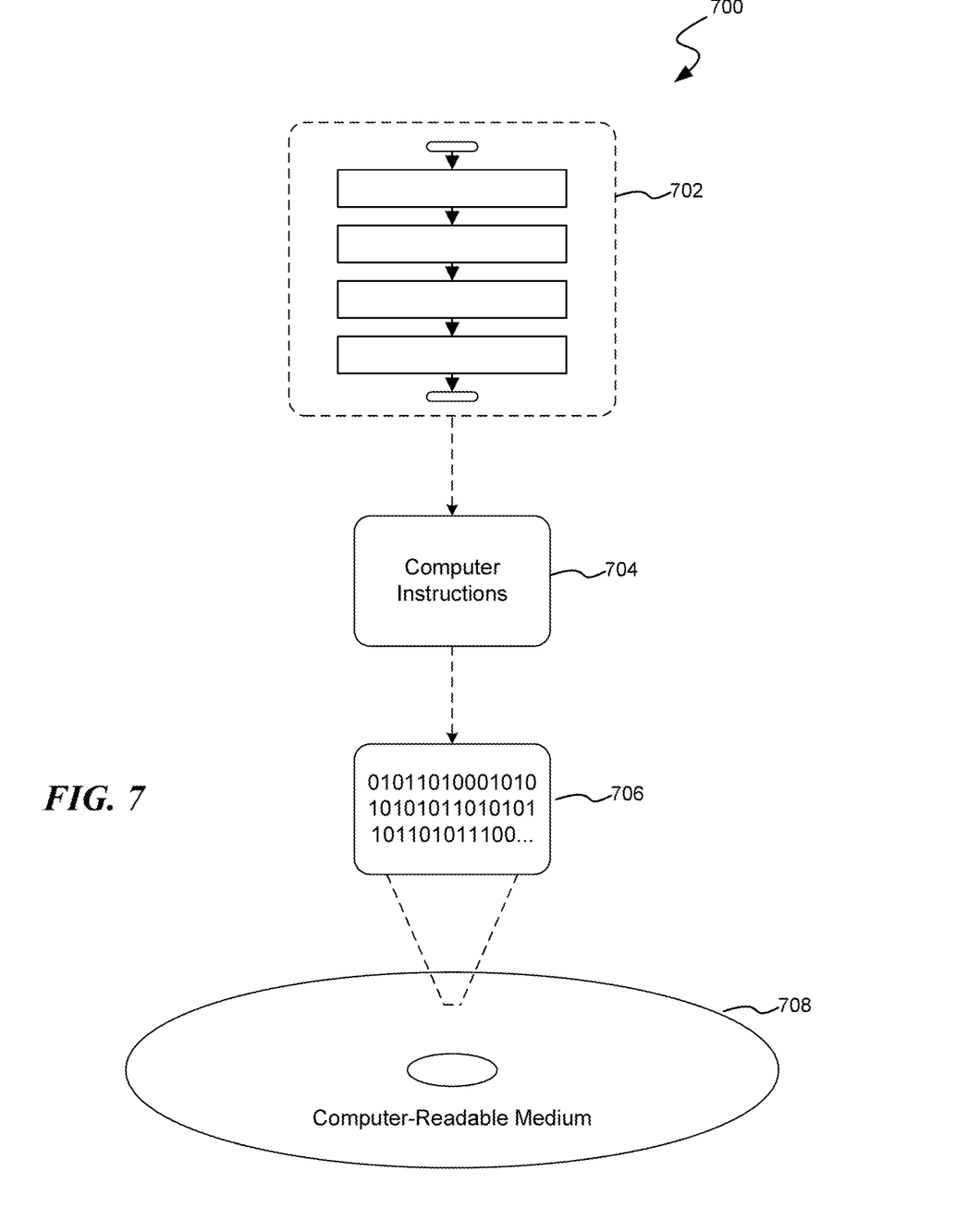
FIG. 7 is a block diagram illustrating an exemplary computer readable medium encoded with instructions for determining a likelihood score of an entity becoming an activity subscriber in accordance with aspects of the disclosed subject matter.

Regarding computer readable media, FIG. 7 is a block diagram illustrating an exemplary computer readable medium encoded with instructions for determining a likelihood score of an entity becoming an activity subscriber in accordance with aspects of the disclosed subject matter. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routines 200, 300 and 500, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
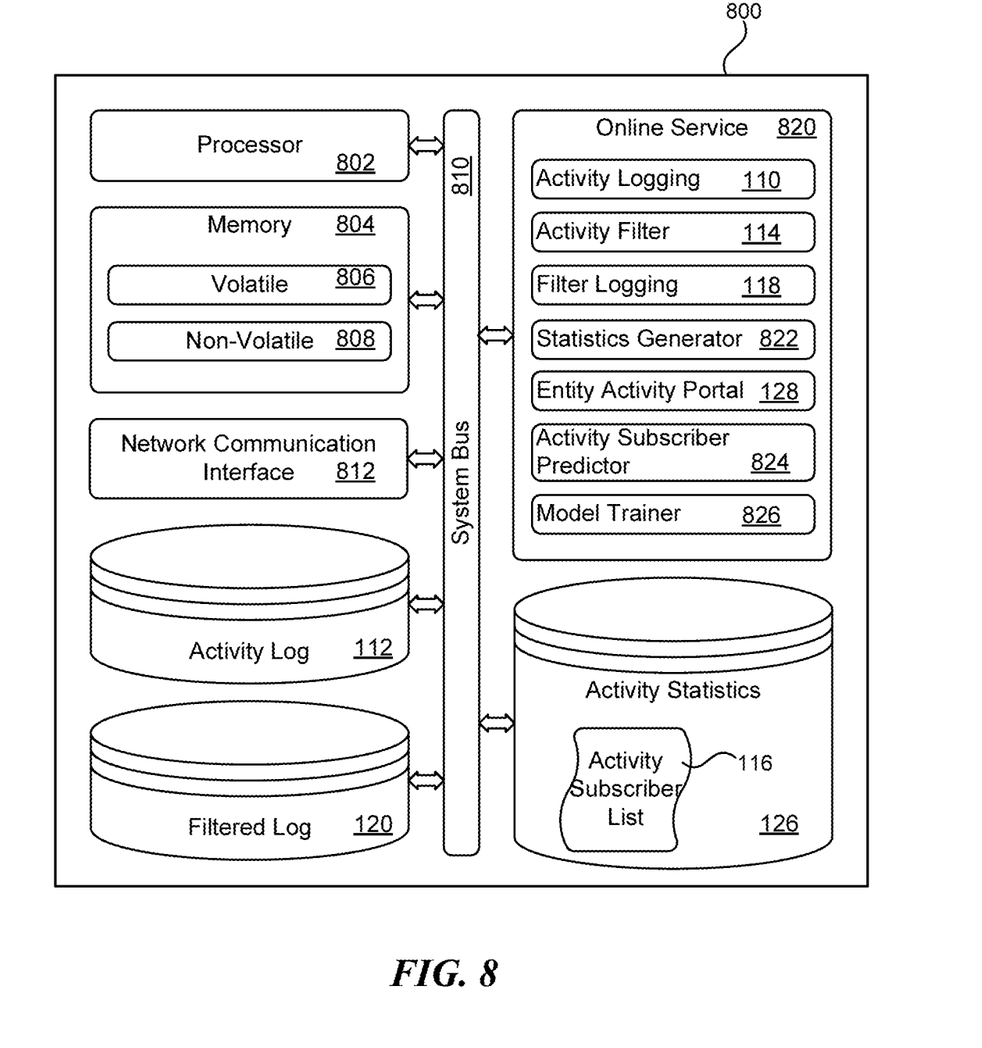
FIG. 8 is a block diagram illustrating an exemplary computer system suitably configured for implementing a system for predicting new activity subscribers according to aspects of the disclosed subject matter.

Turning now to FIG. 8, FIG. 8 is a block diagram illustrating an exemplary computing system 800 (or computing device) suitably configured for implementing a system for predicting new activity subscribers according to aspects of the disclosed subject matter. The computing system 800 typically includes one or more central processing units (or CPUs), such as CPU 802, and further includes at least one memory 804. The CPU 802 and memory 804, as well as other components of the computing system, are interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

As will be further appreciated by those skilled in the art, the CPU 802 executes instructions retrieved from the memory 804, from computer readable media, such as computer readable media 708 of FIG. 7, and/or other executable components in carrying out the various functions of the disclosed subject matter. The CPU 802 may be comprised of any of a number of available processors such as single-processor, multi-processor, single-core units, and multi-core units, which are well known in the art.

Further still, the illustrated computing system 800 typically also includes a network communication interface 812 for interconnecting this computing system with other devices, computers and/or services over a computer network, such as network 1408 of FIG. 14. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network).

The illustrated computing system 800 further includes a suitably configured online service 820. This online service implements the functionality of the online service 100 described in regard to FIG. 1, as well as implementing functionality to predictively identify activity subscribers which includes or operates a machine learning model to predictively identify these subscribers. Indeed, the online service 800 includes an activity logging feature 110 that records user activity in an activity log 112, an activity filter feature 114 that, in conjunction with an activity subscriber list 116, identifies those user activities that correspond to activity subscribers, a filter logging feature 116, a statistics generator 822 that determines both hourly and daily statistics (or other statistics that may be desired), and an activity subscriber portal 128, each of which is described above. It should be appreciated that each of these features are executable features of the computing system 800.

In addition to the above, the illustrated computing system 800 also includes an executable activity subscriber predictor 824. As discussed above in regard to routines 200 and 300, the activity subscriber predictor 824 is configured to identify potential activity subscribers according to user activity with regard to content on the online service. Additionally, the computing system 800 includes an executable model trainer that, in execution, is configure to train a machine learning model to accurately predict potential activity subscribers, as discussed above in regard to routine 500.

Regarding these various components of the illustrated computing system 800, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Figure 9:
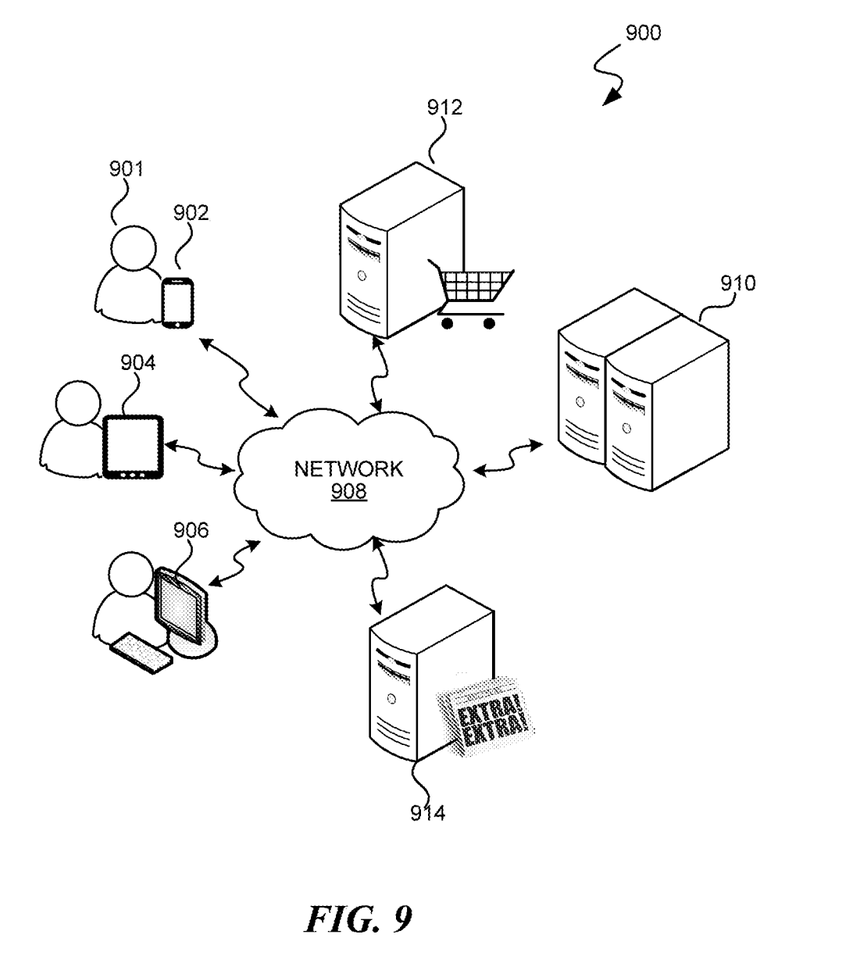
FIG. 9 is a block diagram illustrating an exemplary network environment suitable for implementing aspects of the disclosed subject matter.

Turning now to FIG. 9, FIG. 9 is a block diagram illustrating an exemplary network environment 900 suitable for implementing aspects of the disclosed subject matter. The network environment includes a communication network 908 over which one or more computer users can communicate with an online service 910 for predictively identifying activity subscribers, as may be implemented by computer system 800. For example, the illustrated network shows computer user 901 communicating with the online service 910 via computing device 902.

In the exemplary network environment 900, computer users may utilize a variety of computing devices to communicate with the online service 910 including, by way of illustration and not limitation, mobile phone devices (such as device 902), tablet computing devices (such as device 904), desktop computing devices (such as device 906), notebook computing devices, and the like. These and other computing devices communicate with the online service 910 over a communication network via wired or wireless communication channels, as those skilled in the art will appreciate.

Content sources, such as content sources 912 and 914, may be the source of various content that is posted by users (or the content sources themselves) on the online service 910. As discussed above, an activity subscriber predictor 824 of the online service 910 may be used to identify whether either or both of content sources 912 and 914 are predictively likely to be advantaged as activity subscribers of the online service.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method comprising:
    training a machine learning model to predictively identify content sources that are not activity subscribers that could likely become activity subscribers, wherein training includes:
        analyzing a corpus of activity data to identify a first plurality of content sources that are activity subscribers and a second plurality of content sources that are not activity subscribers;
        providing, to the machine learning model as part of the training, first information regarding the first plurality of content sources as positive examples in a training data that is used to train the machine learning model;

providing, to the machine learning model as part of the training, second information regarding the second plurality of content sources as negative examples in the training data;

obtaining, from the machine learning model and based at least in part on processing of the first information and the second information by the machine learning model, training outputs indicating predicted likelihood scores;

tracking an accuracy of the machine learning model by analyzing the training outputs and actual results information; and modifying, based at least in part on the accuracy and the training outputs, the machine learning model by adjusting at least one of hyperparameters or processing nodes associated with the machine learning model;

accessing a corpus of user activity records indicating interactions with a plurality of content items;

identifying, from the corpus of user activity records, a plurality of user activity records indicating activity with content items corresponding to a content source by users other than the content source;

subsequent to training, providing the plurality of user activity records to the machine learning model as input data to identify the content source as a potential activity subscriber; and notifying the content source with information for becoming an activity subscriber.

2. The computer-implemented method of claim 1, wherein analyzing the corpus of activity data to identify the second plurality of content sources comprises analyzing the corpus to identify content sources that are not activity subscribers having multiple items of content on an online service.

3. The computer-implemented method of claim 2, wherein the multiple items of content are placed on the online service by an entity other than the content source.

4. The computer-implemented method of claim 1, further comprising:

generating activity statistics for the content source; and
including the activity statistics for the content source with the information.

5. The computer-implemented method of claim 1, wherein identifying the content source further includes:

identifying the content source as a likely potential activity subscriber according to the machine learning model having a predicted likelihood score that exceeds a threshold.

6. The computer-implemented method of claim 1, further comprising:

identifying a plurality of likely potential activity subscribers, including the content source, of the plurality of content sources, according to the machine learning model; and for each of the plurality of likely potential activity subscribers:
notifying the likely potential activity subscriber with information for becoming an activity subscriber.

7. The computer-implemented method of claim 6, further comprising:

for each of the plurality of likely potential activity subscribers:
generating activity statistics for the likely potential activity subscriber; and
notifying the likely potential activity subscriber with the activity statistics and information for becoming an activity subscriber.

8. The computer-implemented method of claim 6, wherein analyzing the corpus of activity data to identify the second plurality of content sources that are not activity subscribers further includes:

analyzing the corpus of activity data to identify the plurality of content sources that are not activity subscribers and having multiple items of content on an online service.

9. The computer-implemented method of claim 6, further comprising:

tracking information regarding whether or not the plurality of likely potential activity subscribers takes positive actions to become activity subscribers; and retraining the machine learning model to predictively identify content sources that are not activity subscribers that could likely become activity subscribers using, at least in part, the tracking information.

10. The computer-implemented method of claim 6, wherein identifying the plurality of likely potential activity subscribers further includes:

identifying the plurality of likely potential activity subscribers according to the machine learning model having a predicted likelihood score that exceeds a predetermined threshold.

11. A computer-readable medium bearing computer-executable instructions which, when executed on a computing system comprising at least a processor, carry out a method, comprising:

training a machine learning model to predictively identify content sources that are not activity subscribers that could likely become activity subscribers, wherein training includes:

analyzing a corpus of activity data to identify a first plurality of content sources that are activity subscribers and a second plurality of content sources that are not activity subscribers;

providing, to the machine learning model as part of the training, first information regarding the first plurality of content sources as positive examples in a training data that is used to train the machine learning model; and providing, to the machine learning model as part of the training, second information regarding the second plurality of content sources as negative examples in the training data;

obtaining, from the machine learning model and based at least in part on processing of the first information and the second information by the machine learning model, training outputs indicating predicted likelihood scores;

tracking an accuracy of the machine learning model by analyzing the training outputs and actual results information; and modifying, based at least in part on the accuracy and the training outputs, the machine learning model by adjusting at least one of hyperparameters or processing nodes associated with the machine learning model;

accessing a corpus of user activity records indicating interactions with a plurality of content items;

identifying, from the corpus of user activity records, a plurality of user activity records indicating activity with content items corresponding to a content source by users other than the content source;

subsequent to training, providing the plurality of user activity records to the machine learning model as input data to identify the content source as a potential activity subscriber;
generating activity statistics for the content source based at least in part on the corpus of activity data; and
notifying the content source with the activity statistics and information for becoming an activity subscriber.

12. The computer-readable medium of claim 11, wherein analyzing the corpus of activity data to identify the second plurality of content sources comprises analyzing the corpus to identify content sources that are not activity subscribers having multiple items of content on an online service.

13. The computer-readable medium of claim 12, wherein the multiple items of content are placed on the online service by an entity other than the content source.

14. The computer-readable medium of claim 11, wherein identifying the content source further includes:
identifying the content source as a likely potential activity subscriber according to the machine learning model having a predicted likelihood score that exceeds a threshold.

15. The computer-readable medium of claim 11, further comprising:
identifying a plurality of likely potential activity subscribers, including the content source, of the plurality of content sources, according to the machine learning model; and
for each of the plurality of likely potential activity subscribers:
notifying the likely potential activity subscriber with information for becoming an activity subscriber with an online service.

16. The computer-readable medium of claim 15, wherein analyzing the corpus of activity data to identify the second plurality of content sources includes analyzing the corpus of activity data to identify content sources that are not activity subscribers and having multiple items of content on the online service.

17. The computer-readable medium of claim 16, wherein the multiple items of content of the plurality of content sources are placed on the online service by an entity other than the corresponding content source.

18. A computer system comprising:
a processor; and
a memory, wherein the processor executes instructions stored in the memory as part of or in conjunction with additional components, the additional components comprising:
an executable activity subscriber predictor that, in execution on the computer system:
trains a machine learning model to predictively identify content sources that are not activity subscribers that could likely become activity subscribers, wherein training includes:
analyzing a corpus of activity data to identify a first plurality of content sources that are activity subscribers and a second plurality of content sources that are not activity subscribers;
providing, to the machine learning model as part of the training, first information regarding the first plurality of content sources as positive examples in a training data that is used to train the machine learning model; and
providing, to the machine learning model as part of the training, second information regarding the second plurality of content sources as negative examples in the training data;
obtaining, from the machine learning model and based at least in part on processing of the first information and the second information by the machine learning model, training outputs indicating predicted likelihood scores;
tracking an accuracy of the machine learning model by analyzing the training outputs and actual results information; and
modifying, based at least in part on the accuracy and the training outputs, the machine learning model by adjusting at least one of hyperparameters or processing nodes associated with the machine learning model;
accesses a corpus of user activity records indicating interactions with a plurality of content items;
identifies, from the corpus of user activity records, a plurality of user activity records indicating activity with content items corresponding to a content source by users other than the content source;
provides the plurality of user activity records to the machine learning model as input data, subsequent to training the machine learning model, to identify the content source as a potential activity subscriber; and
notifies the content source with information for becoming an activity subscriber.

19. The computer system of claim 18, wherein the executable activity subscriber predictor, in execution on the computer system, further:
identifies a plurality of likely potential activity subscribers, including the content source, of the plurality of content sources, according to the machine learning model; and
for each of the plurality of likely potential activity subscribers:
notifies the likely potential activity subscriber with information for becoming an activity subscriber with an online service.

20. The computer-implemented method of claim 1, further comprising:
identifying the one or more content items, wherein identifying the one or more content items includes:
aggregating a plurality of activity data in connection with a plurality of content items;
for each of the plurality of content items, identifying a respective corresponding content source; and
determining the one or more content items from the plurality of content items based at least in part on a determination that the content source is not an activity subscriber,
wherein the identifying the respective corresponding content source for each of the plurality of content items is based at least in part on at least one of:
a source location identifier;
one or more tags;
a visual similarity; or
a textual similarity.

* * * * *